United States Patent
Yang (10) Patent No.: US 10,401,509 B2
(45) Date of Patent: Sep. 3, 2019

(54) RADIATION DETECTOR AND USES THEREOF

(71) Applicant: SAINT-GOBAIN CERAMICS & PLASTICS, INC., Worcester, MA (US)

(72) Inventor: Kan Yang, Solon, OH (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 15/956,411

(22) Filed: Apr. 18, 2018

(65) Prior Publication Data

US 2018/0306934 A1 Oct. 25, 2018

Related U.S. Application Data (60) Provisional application No. 62/486,539, filed on Apr. 18, 2017.

(51) Int. Cl.
*G01T 1/28* (2006.01)
*G01T 1/20* (2006.01)
(Continued)

(52) U.S. Cl.
CPC .......... *G01T 1/28* (2013.01); *G01T 1/10* (2013.01); *G01T 1/202* (2013.01); *G01T 1/2018* (2013.01); *G01T 1/248* (2013.01)

(58) Field of Classification Search
CPC ......... G01T 1/10; G01T 1/2018; G01T 1/202; G01T 1/248; G01T 1/28
See application file for complete search history.

(56) References Cited

U.S. PATENT DOCUMENTS 4,236,071 A * 11/1980 Chimenti .......... G01N 21/64
204/157.22
6,413,311 B2 7/2002 Melcher et al.
(Continued)

FOREIGN PATENT DOCUMENTS

WO 2015047935 A1 4/2015
WO 2016081470 A1 5/2016

OTHER PUBLICATIONS

Goethem et al., "Investigations and corrections of the light output uniformity of CsI(Tl) crystals," Nuclear Instruments and Methods in Physics Research A(526), 2004, pp. 455-476, Elsevier.
(Continued)

*Primary Examiner* — Marcus H Taningco
(74) *Attorney, Agent, or Firm* — Abel Law Group, LLP; Robert N Young (57) ABSTRACT

A radiation detector can include a logic element configured to determine an adjusted value for light emission of a luminescent material. A method of using the radiation detector can include determining an adjusted value of a luminescent material. The adjustment can be based on an inverse correlation between decay times corresponding to signal pulses and values of light emissions corresponding to the signal pulses. In an embodiment, the logic element may be further configured to obtain a measured value of a decay time and a measured value for the light emission, and determining an adjusted value for the light emission can be based on the measured value of the decay time and measured value for the light emission.

20 Claims, 7 Drawing Sheets

(51) Int. Cl.
    *G01T 1/24*     (2006.01)
    *G01T 1/10*     (2006.01)
    *G01T 1/202*     (2006.01)

(56) References Cited

U.S. PATENT DOCUMENTS

| | | | |
|---|---|---|---|
| 6,914,677 B2* | 7/2005 | Mader | G01N 21/6428 |
| | | | 250/458.1 |
| 7,592,587 B2 | 9/2009 | Stein et al. | |
| 8,084,742 B1 | 12/2011 | Nagarkar | |
| 9,947,427 B2 | 4/2018 | Yang et al. | |
| 2002/0090050 A1* | 7/2002 | Nutt | A61B 6/032 |
| | | | 378/19 |
| 2008/0044922 A1 | 2/2008 | Mueller | |
| 2009/0220260 A1* | 9/2009 | Denton | G03G 9/0902 |
| | | | 399/49 |
| 2011/0192981 A1 | 8/2011 | Menge et al. | |
| 2015/0359472 A1* | 12/2015 | Botvinick | A61B 5/14556 |
| | | | 600/329 |

OTHER PUBLICATIONS

Wagner et al., "Energy resolution and energy-light response of CsI(Tl) scintillators for charged particle detection," Nuclear Instruments and Methods in Physics Research A(456), 2001, 24 pages, Elsevier.

International Search Report and Written Opinion for PCT/US2018/028147, dated Jul. 31, 2018, 14 pages.

NaI(Tl) and Polyscin® NaI(Tl) Sodium Iodide, Saint-Gobain Ceramics & Plastics, Inc., publication date unknown, copyright 2005, 2 pages.

* cited by examiner

RADIATION DETECTOR AND USES THEREOF

CROSS-REFERENCE TO RELATED APPLICATION

This application claims priority under 35 U.S.C. § 119(e) to U.S. Provisional Patent Application No. 62/486,539, entitled "Radiation Detector and Uses Thereof", by Kan Yang, filed Apr. 18, 2017, which is assigned to the current assignee hereof and incorporated herein by reference in its entirety.

FIELD OF THE DISCLOSURE

The present disclosure is directed to radiation detectors and methods of using such radiation detectors.

BACKGROUND

Scintillator-based detectors are used in a variety of applications, including research in nuclear physics, oil exploration, field spectroscopy, container and baggage scanning, and medical diagnostics. When a scintillator material of the scintillator-based detector is exposed to ionizing radiation, the scintillator material captures energy of incoming radiation and scintillates, emitting the captured energy in the form of photons. Light output of scintillator materials can be affected for a variety of reasons. Continued improvements are desired.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise stated, the content of different components of the scintillator compound described herein refers to the content of the crystal, as opposed to the melt.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

Non-uniform light output of a luminescent material can adversely affect energy resolution and may be caused by various reasons. For instance, a non-uniform dopant concentration distribution in the luminescent material can cause non-uniform scintillation light emission and varying decay times in response to a targeted radiation. According to embodiments disclosed herein, an inverse correlation between light emissions and decay times can be established and used to adjust the electronic light emission signal for a luminescent material having a non-uniform concentration distribution of a dopant and improve energy resolution of the luminescent material. In further embodiments, a radiation detector can include a luminescent material, the electronic light emission signal for which can be adjusted to improve energy resolution.

According to an embodiment, the luminescent material can include a scintillator material to detect neutrons, gamma radiation, other targeted radiation, or any combination thereof. In a further embodiment, the luminescent material can include an inorganic material, such as a monocrystalline material or a polycrystalline material. In a particular embodiment, the luminescent material can be monocrystalline and capable of detecting and discriminating neutrons and gamma rays.

According another particular embodiment, the luminescent material can include a halide, a perovskite, a silicate, or a garnet. The luminescent material can have a stoichiometric composition or a non-stoichiometric composition. The luminescent material can include an activator dopant that can help to improve a property of the luminescent material. For instance, the dopant can include a scintillation activator, an element that may improve decay time, pulse shape discrimination, or the like, or a combination thereof. The activator dopant can be present at a certain concentration that can help to improve light emission and energy resolution. For example, the activator dopant can be present in an amount of at least 0.03 mol %, or at least 0.1 mol %, or at least 0.2 mol %, or at least 0.3 mol % with respect to the element that is replaced by the activator dopant. In a further embodiment, increasing the concentration of the activator dopant may adversely affect another property of an alkali metal halide, such as performance with respect to pulse shape discrimination. Thus, in certain embodiments, the activator dopant may be present in an amount of at most 1 mol %, at most 0.9 mol %, at most 0.8 mol %.

Moreover, the activator dopant can be present in the luminescent material in a range of any of the above minimum and maximum values, such as 0.03 mol % to 1 mol %, or 0.1 mol % to 0.8 mol %. The activator dopant can include either a post-transition metal, such as thallium, or a lanthanide, such as europium, or a combination thereof. In a more particular embodiment, the luminescent material can include an alkali metal halide material co-doped with a scintillation activator and another element.

According to an embodiment, an exemplary alkali metal halide material can be represented by a general formula of $A_yB_{(1-y)}X:Ac$, wherein A represents an alkali metal, B represents an alkali metal different from A or a combination of alkali metals that are different from A, Ac is a scintillation activator, X is at least one halogen or any combination of halogens, and $0<y<1$. In certain embodiments, 'y' can be at least 0.005, or at least 0.01, or at least 0.02, or at least 0.03. In other embodiments, 'y' can be at most 0.25, such as at most 0.1, or at most 0.02, or at most 0.005. Moreover, 'y' can be in a range of any of the above minimum and maximum values, such as in a range of 0.005 to 0.25 or in a range of 0.005 to 0.02. In a further embodiment, the alkali metal halide can optionally include an element Me, wherein Me can represent Sc, Bi, Y, La, Lu, a Group II element (e.g., Mg, Ca, Sr, Ba, or any combination thereof), or any combination thereof. In another embodiment, the alkali metal halide material may not include a dopant of a Group II element.

A particular example of the alkali metal halide material can include lithium co-doped sodium halide with thallium as the activator. More particularly, the halogen of the halide can be I or a combination of I and Br including at least 50 mol %, at least 70 mol %, or at least 91 mol % I. For example, the luminescent material can have a formula of $Li_yNa_{(1-y)}I:Tl_z$, wherein $0<y\leq0.25$, such as $0<y\leq0.02$, and $0<z\leq0.1$. In a particular embodiment, 'y' can be in a range of 0.005 to 0.02.

According to an embodiment, the luminescent material can include Li that is enriched with $^6Li$ so that $^6Li$ makes up more than 7.5% of the total Li content. In a particular embodiment, $^6Li$ makes up at least 70%, or at least 80%, or at least 95% of the total Li content. In another embodiment, the luminescent material can include Li wherein $^6Li$ makes up at most 7.5% of the total Li content.

In another embodiment, Li can be present in the luminescent material in a concentration of at least 0.5 mol %, or at least 2 mol %, or at least 4 mol %, or at least 8 mol % to allow the luminescent material to have improved detectability of neutrons and pulse shape discrimination. In another embodiment, Li can be present in a concentration of at most 25 mol %, such as at most 12 mol %, at most 8 mol %, at most 4 mol %, or at most 2.5 mol % to help to reduce adverse effect on decay time, energy resolution, or both. Moreover, the luminescent material can include a Li concentration in a range including any of the minimum and maximum percentages noted herein, such as in a range of 0.5 mol % to 25 mol % or in a range of 4 mol % to 12 mol %.

In still another embodiment, the alkali metal halide material can include lithium and a Group II element as co-dopants. The Group II element can include strontium, calcium, barium, magnesium, or any combination thereof. The Group II element co-dopant can be present in an amount that is significantly less than lithium. For instance, the total concentration of the Group II element co-dopant can be at most 10% of the concentration of lithium, such as at most 8% or at most 7.5% or at most 5.5% of the concentration of lithium. In another instance, the total concentration of the Group II element co-dopant can be at least 2% of the concentration of lithium, such as at least 2.5% or at least 4% of the concentration of lithium. Moreover, the total concentration of the Group II element co-dopant can be in a range including any of the minimum or maximum percentages disclosed herein. In a particular embodiment, the total concentration of the Group II element co-dopant can be 5% of the concentration of lithium. In still another embodiment, the total concentration of the Group II element co-dopant can be at least 0.01 mol %, such as at least 0.03 mol % or at least 0.05 mol %. In still another embodiment, the total concentration of the Group II element co-dopant can be at most 0.1 mol %, or at most 0.08 mol % or at most 0.075 mol %. Moreover, the total concentration of the Group II element co-dopant can be in a range including any of the minimum or maximum percentages disclosed herein. In a particular application, the luminescent material can include lithium and strontium co-doped sodium halide with thallium as the activator, wherein the concentration of strontium is 5% of the concentration of lithium.

Figure 1:
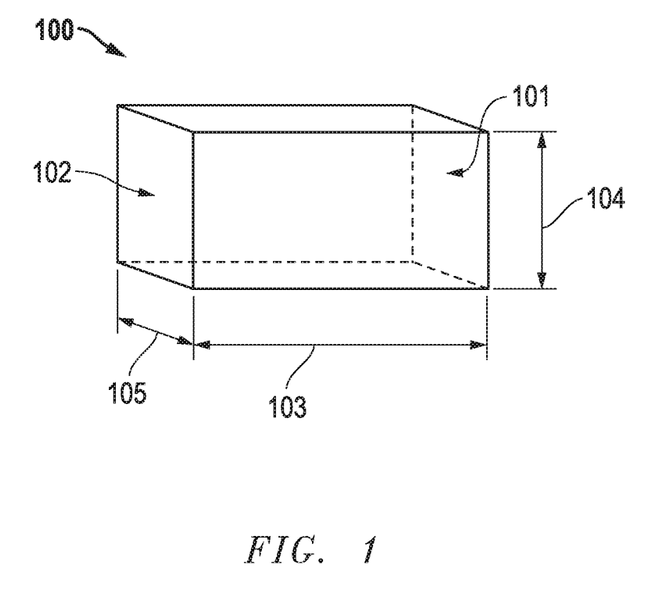
FIG. 1 includes an illustration of a luminescent material in accordance with an embodiment.

In an embodiment, the luminescent material can be a large scintillator having a width, a length, and a depth. FIG. 1 includes an illustration of a particular embodiment of the luminescent material 100. The luminescent material 100 has a rectangular cross-sectional shape. In a further embodiment, the cross-sectional shape of the luminescent material can be square, circular, hexagonal, or another suitable shape.

The luminescent material includes an end 101 that can be configured to receive radiation and an end 102 opposite the end 101. The end 102 can be the scintillation light exiting end and configured to be coupled to an optical interface. The luminescent material includes a depth 103 extending between the ends 101 and 102, a length 104, and a width 105. The length 104 and the width 105 may be the same or may be different. In an embodiment, the length 104 and the width 105 can be at least 15 mm, such as at least 20 mm, or at least 25 mm. In another instance, the length 104 and the width 105 can be at most 100 mm, such as at most 75 mm, or at most 50 mm. Moreover, the length 104 and the width 105 can be in a range including any of the minimum and maximum values noted herein, such as in a range from 15 mm to 100 mm or in a range from 25 mm to 75 mm. In a further embodiment, the depth 203 can be at least 25 mm, such as at least 45 mm, at least 80 mm, at least 120 mm, or at least 220 mm. In still another embodiment, the depth 203 can be at most 500 mm, such as at most 420 mm, at most 380 mm, at most 310 mm, or at most 250 mm. Moreover, the depth 203 can be in a range including any of the minimum and maximum values noted herein, such as in a range from 25 mm to 500 mm, or in a range from 80 mm to 420 mm. In a particular embodiment, the luminescent material can have at least one dimension, such as the depth 103, the length 104, or the width 105, of at least 25 mm. In another embodiment, the luminescent material can have a volume of at least 500 cm$^3$, at least 750 cm$^3$, or at least 1000 cm$^3$.

According to an embodiment, when the luminescent material is large, such as having at least one dimension of at least 25 mm, the dopant within the luminescent material may not be evenly distributed. According to another embodiment, the concentration of the dopant can vary along at least one dimension of the luminescent material, such as the width, length, depth, or any combination thereof. In a particular embodiment, the alkali metal halide including an alkali metal dopant may have a non-uniform distribution of the alkali metal dopant. In a more particular example, the concentration of Li can vary along at least one dimension of NaI co-doped with Li and Tl, and even more particularly, along the depth of NaI co-doped with Li and Tl. In a further embodiment, non-uniform distribution of the alkali metal dopant concentration can result from growth of the luminescent material.

In an embodiment, the luminescent material can be grown according to the Bridgman-Stockbarger technique, the Czochralski technique, the Kyropoulos technique, the Edge-defined Film Growth (EFG) technique, the Gradient Freeze technique, or the like. During growth of the luminescent material, the alkali metal dopant may be unevenly incorporated into the luminescent material from the melt, particularly in the growing direction. The as-grown luminescent material can be cut into suitable sizes and shapes to form the luminescent material that is suitable for radiation detector applications.

Figure 2:
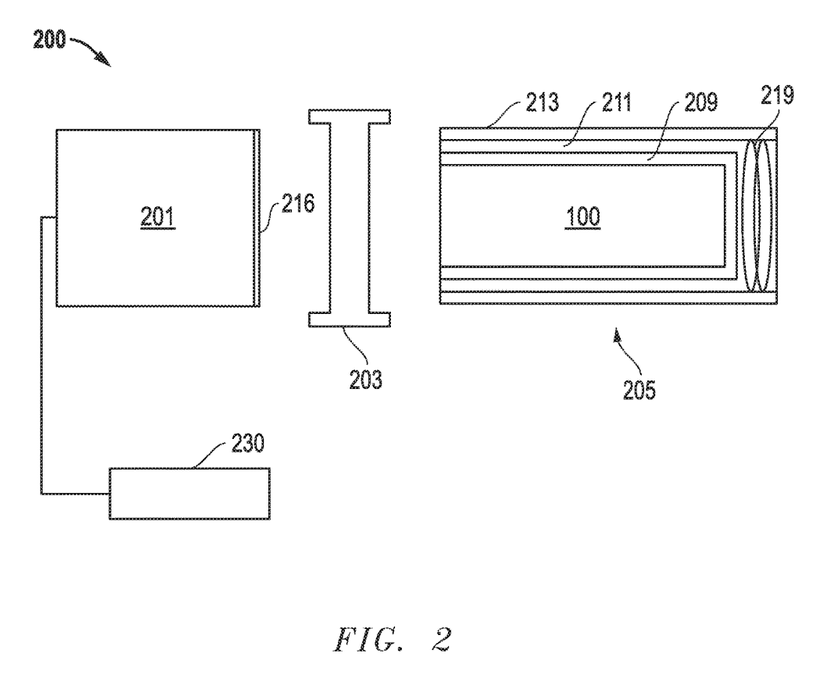
FIG. 2 includes an illustration of a radiation detector in accordance with an embodiment.

FIG. 2 illustrates a particular embodiment of a radiation detector 200. The radiation detector 200 can include a photosensor 201, an optical interface 203, and a scintillation device 205. The scintillation device 205 can include the luminescent material 100. The luminescent material 100 can be substantially surrounded by a reflector 209. In an embodiment, the reflector 209 can include polytetrafluoroethylene (PTFE), another material adapted to reflect light emitted by the scintillation crystal 100, or a combination thereof. In an illustrative embodiment, the reflector 209 can be substantially surrounded by a shock absorbing member 211. The scintillation device 205 can further include at least one stabilization mechanism adapted to reduce relative movement between the luminescent material 100. The stabilization mechanism may include a spring 219, an elastomer, another suitable stabilization mechanism, or a combination thereof. The stabilization mechanism can be adapted to apply lateral forces, horizontal forces, or a combination thereof, to the luminescent material to stabilize its position relative to one or more other elements of the radiation detector 200. The luminescent material 100, the reflector 209, and the shock absorbing member 211 can be housed within a casing 213.

As illustrated, the optical interface 203 is adapted to be coupled between the photosensor 201 and the scintillation device 205. The optical interface 203 is also adapted to facilitate optical coupling between the photosensor 201 and the scintillation device 205. The optical interface 203 can include a polymer, such as a silicone rubber, that is polarized to align the reflective indices of the scintillation crystal 100 and the input window 216. In other embodiments, the optical interface 203 can include gels or colloids that include polymers and additional elements.

Although the photosensor 201, the optical interface 203, and the scintillation device 205 are illustrated separate from each other, skilled artisans will appreciate that photosensor 201 and the scintillation device 205 can be coupled to the optical interface 203, with the optical interface 203 disposed between the photosensor 201 and the scintillation device 205. The scintillation device 205 and the photosensor 201 can be optically coupled to the optical interface 203 with other known coupling methods, such as the use of an optical gel or bonding agent, or directly through molecular adhesion of optically coupled elements.

The photosensor 201 may be a photomultiplier tube (PMT), a semiconductor-based photomultiplier, photodiodes, hybrid photosensors, or a combination thereof. As used herein, a semiconductor-based photomultiplier in intended to mean a photomultiplier that includes a plurality of photodiodes, wherein each of the photodiodes have a cell size less than 1 mm, and the photodiodes are operated in Geiger mode. In practice, the semiconductor-based photomultiplier can include over a thousand of photodiodes, wherein each photodiode has a cell size in a range of 10 microns to 100 microns and a fixed gain. The output of the semiconductor-based photomultiplier is the sum signal of all Geiger mode photodiodes. The semiconductor-based photomultiplier can include silicon photomultiplier (SiPM) or a photomultiplier based on another semiconductor material. For a higher temperature application (e.g., higher than 125° C.), the other semiconductor material can have a wider bandgap energy than silicon. An exemplary material can include SiC, a Ga-Group V compound (e.g., GaN, GaP, or GaAs), or the like. An avalanche photodiode has a larger size, such as a light-receiving area of least 1 $mm^2$ and is operated in a linear mode. The photosensor 201 can receive photons emitted by the scintillation device 205, via an input window 216, and produce electronic pulses based on numbers of photons that it receives. The photosensor 201 can be housed within a tube or housing made of a material capable of protecting the photosensor 201, an electronics module 300, or a combination thereof, such as a metal, metal alloy, other material, or any combination thereof.

Figure 3:
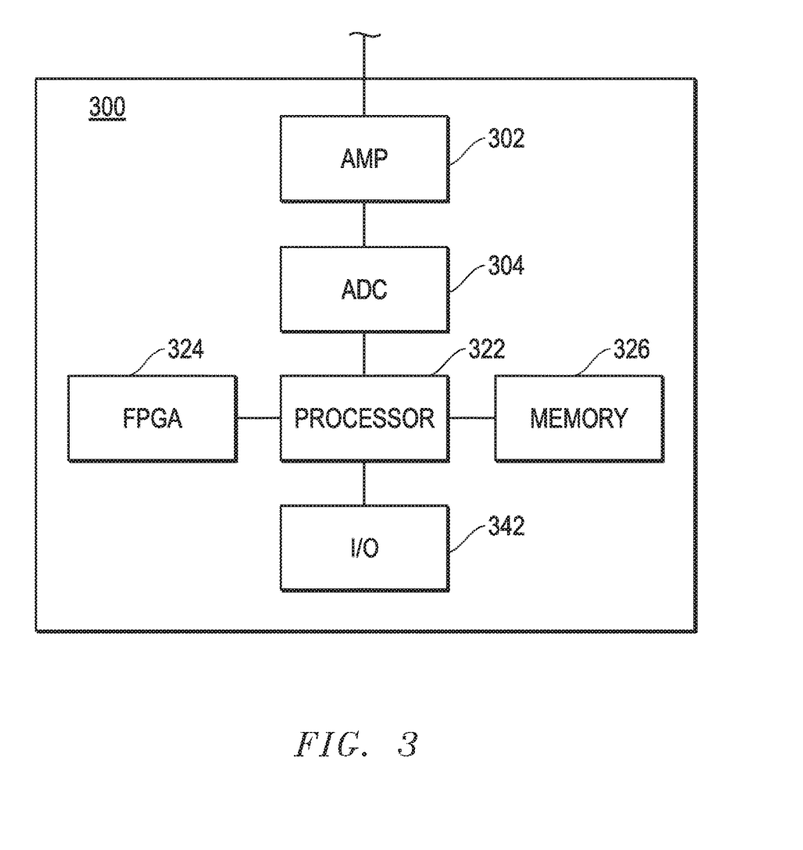
FIG. 3 includes a schematic depiction of an electronics module of the radiation detector of FIG. 1.

The electronics module 300 can be coupled to the photosensor 201. The electronic pulses can be shaped, digitized, analyzed, or any combination thereof by the electronics module 300 to provide a count of the photons received at the photosensor 201 or other information. The electronics module 300 can include an amplifier, a pre-amplifier, a discriminator, an analog-to-digital signal converter, a photon counter, a pulse shape analyzer or discriminator, another electronic component, or any combination thereof. FIG. 3 includes a schematic diagram of an illustrative, non-limiting embodiment of the electronics module 300. As illustrated, an amplifier 302 is coupled to an analog-to-digital converter 304, which is coupled to a processor 322. In an embodiment, the amplifier 302 can be a high fidelity amplifier. The processor 322 can be coupled to a programmable/re-programmable processing module ("PRPM"), such as a field programmable gate array ("FPGA") 324 or application-specific integrated circuit ("ASIC"), a memory 326, and an input/output ("I/O") module 342. The couplings may be unidirectional or bidirectional. The functions provided by the components are discussed in more detail below. A logic element can include the processor 322, the FPGA 324, ASIC, another suitable component configured to perform logic or computational operation, or any combination thereof. In a particular embodiment, the logic element can be configured to adjust light emission for the luminescent material 100. In another embodiment, more, fewer, or different components can be used in the electronics module 300. For example, functions provided by the FPGA 324 may be performed by the processor 322, and thus, the FPGA 324 is not required. The FPGA 324 can act on information faster than the processor 322.

The radiation detector 200 can be configured to be suitable for different applications, such as radiation detectors for a security detection apparatus, an oil well-logging detector apparatus, a gamma ray spectroscopy apparatus, an isotope identification apparatus, a public area detector apparatus, a large area survey apparatus, a baggage and cargo scanning apparatus, a Single Positron Emission Computer Tomography (SPECT) apparatus or a Positron Emission Tomography (PET) apparatus, an x-ray imaging apparatus, a portal monitor radiation detector apparatus, a handheld radiation detector apparatus, a backpack radiation detector apparatus, or a personal radiation detector apparatus.

According to an embodiment, concentrations of certain dopants can affect the decay time of the luminescent material and the light emission for the luminescent material in response to a captured radiation. Thus, with respect to the luminescent material having non-uniform distribution of the concentration of a dopant, the decay time and light emission can depend on the location where a targeted radiation, such as gamma radiation, is captured within the luminescent material. Because light emission is used to determine the energy of the interacting radiation, there could be a variation in the energy measurement. In other words, the energy resolution would be poor.

Figure 4:
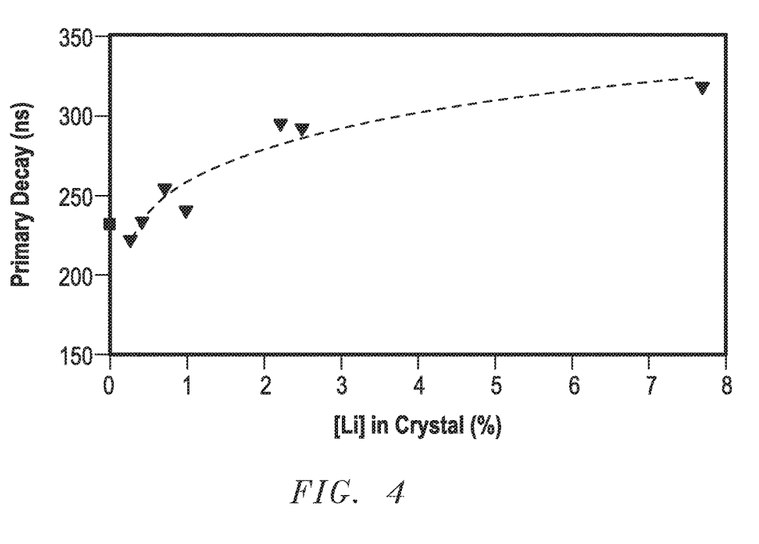
FIG. 4 includes a plot of decay time of a luminescent material over a dopant concentration range in accordance with an embodiment.
Figure 5:
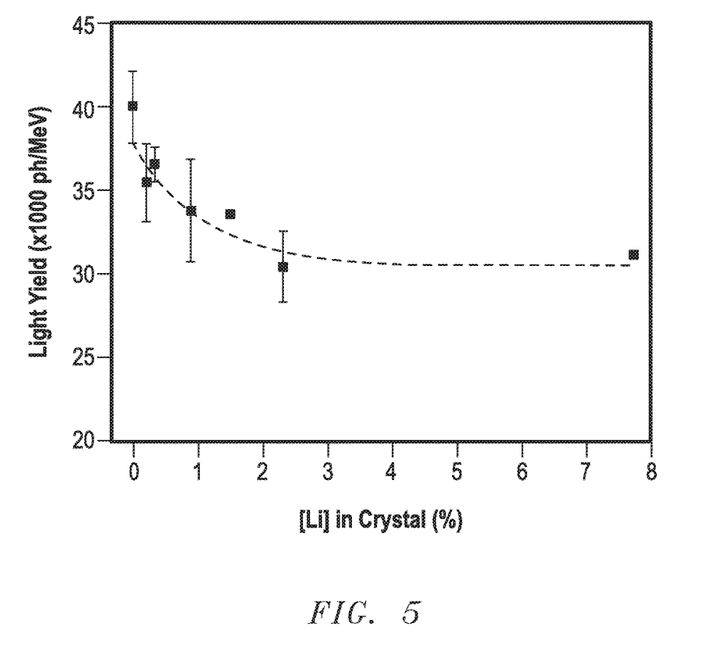
FIG. 5 includes a plot of light emission of a luminescent material over a dopant concentration range in accordance with an embodiment.

In a particular embodiment, the gamma radiation pulse decay time of the luminescent material may be affected by varying concentrations of an alkali metal dopant, such as Li. FIG. 4 and FIG. 5 include, respectively, a plot of Li concentration versus pulse decay time and Li concentration versus light emission for gamma radiation of $Li_yNa_{(1-y)}I:Tl$. The ordinate of FIG. 4 is scintillation pulse decay time in units of nanoseconds and abscissa is Li concentrations in units of mol %. The pulse decay time is the time interval between the moment of the peak photon flux in each pulse and the moment when photon flux has fallen to a factor of 1/e (36.8%) of the peak photon flux. The ordinate in FIG. 5 is scintillation light emission in units of photons/MeV of gamma ray energy, and the abscissa is Li concentrations in units of mol %. Light emission, as used in this disclosure, is intended to mean light yield. As illustrated, the gamma radiation pulse decay time increases and light emission decreases as "y" increases.

Figure 6:
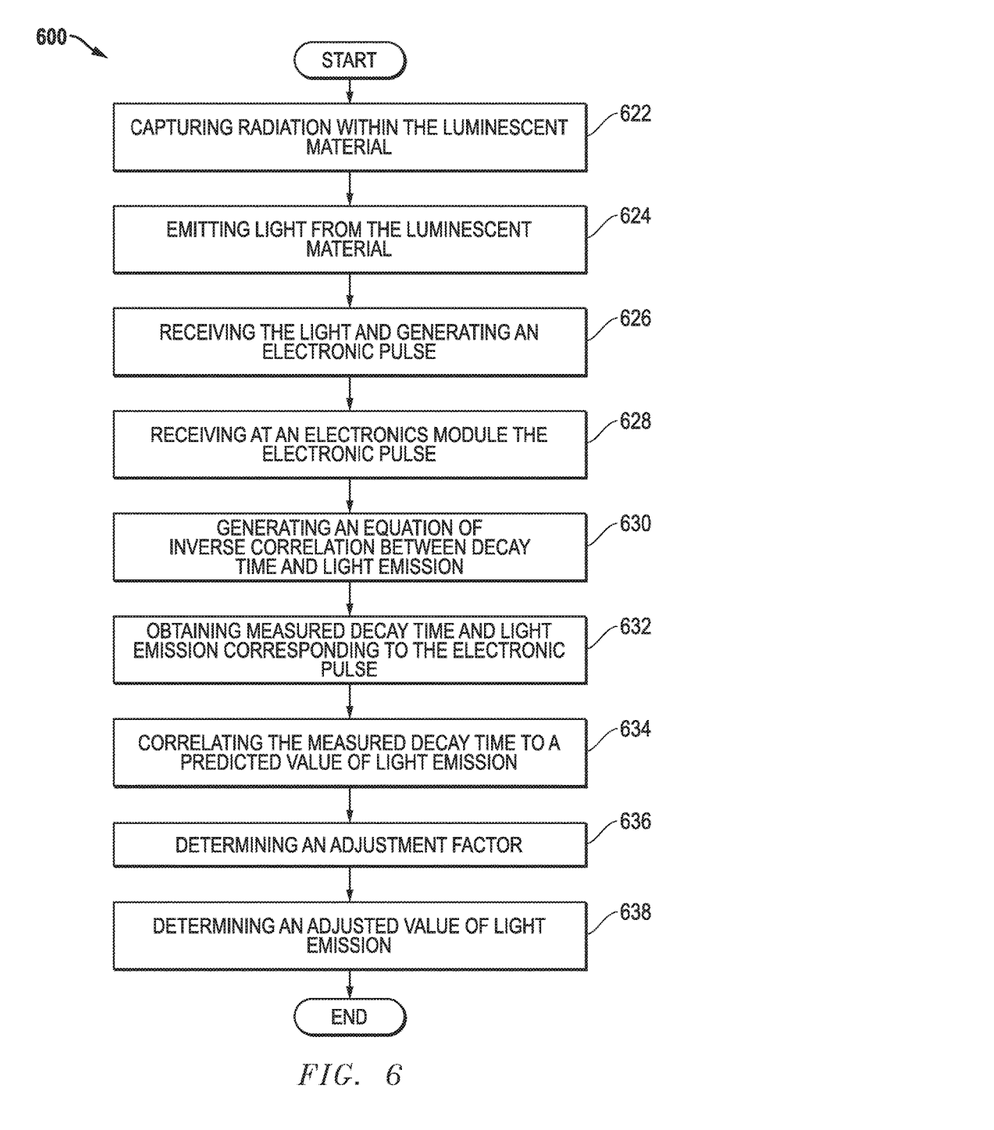
FIG. 6 includes a flow chart illustrating a method in accordance with an embodiment.

According to an embodiment, the electronic light emission signal of the luminescent material can be adjusted for the variation caused by non-uniform distribution of the concentration of a dopant. In a particular embodiment, the adjustment of light emission can be based on an inverse correlation between the light emission and the decay times corresponding to the same signal pulses. FIG. 6 includes a flow chart illustrating an exemplary method 600 that can be used to adjust light emission of the luminescent material. The method may be particularly suitable for alkali metal halide having an alkali co-dopant and not including an alkaline earth element.

In an embodiment, the method 600 can include capturing radiation within the luminescent material, at block 622, emitting light from the luminescent material, at block 624, and receiving the light and generating an electronic pulse, at block 626. Radiation can be received by the luminescent material 100 at the radiation-receiving end 101, and the radiation can be captured within the luminescent material 100. Scintillation light can be emitted in response to capturing the radiation. For $Li_yNa_{(1-y)}I:Tl$, the targeted radiation is gamma radiation and neutrons, and scintillation light can be emitted when either is captured by the luminescent material 100. The scintillation light is transmitted from the luminescent material 100 and received by the photosensors 201. The method can include receiving the electronic pulse at the electronic module, at block 628. The electronic pulse generated from the photosensor 201 can be transmitted from the photosensor 201 to the electronics module 300 for further processing.

Referring to FIG. 3, the electronic pulse can be amplified by the amplifier 302 before reaching the logic element. When the logic element is configured to work with analog signals, the electronic pulse can be received by the logic element without converting the electronic pulse to a digital signal. When the logic element is configured to work with digital signals, the electronic pulse can be converted to a digital signal before it is received by the logic element. Thus, the amplified electronic pulse can be optionally converted to a digital signal by the analog-to-digital converter 304. In another embodiment, the converter 304 is not used. In the description below, the logic element will operate on the digital signal.

After the converter 304, the digital signal can be received by the logic element. In an embodiment, the logic element can be processor 322, and thus, the processor 322 may operate on the digital signal. In another embodiment, the logic element can be the FPGA 324, and the digital signal can be transmitted from the processor 322 to the FPGA 324. The FPGA 324 can include a look-up table or information (e.g., an equation) in other forms and determine an adjusted value of light emission corresponding to the digital signal. In another embodiment, the look-up table or the information can be part of the ASIC or may be in another device, such as an integrated circuit, a disk drive, or a suitable persistent memory device. In a further embodiment, the logic element can be outside the electronics module 300, and thus, the digital signal can be transmitted from the processor 322 to the I/O 342, which can allow the digital signal to pass to a computer or another apparatus capable of processing or analyzing the digital signal.

In an embodiment, before adjustment, at block 630, an equation representing the inverse correlation between decay times and light emission corresponding to the same signal pulses for the luminescent material can be generated. Data can be collected for different concentrations of the alkali metal dopant within the alkali metal halide when detecting radiation using a particular gamma ray source, for example, $^{137}Cs$, which emits gamma radiation at an energy of 662 keV. In a particular embodiment, a plot of the alkali metal dopant concentration versus light emission can provide a linear inverse correlation between the pulse decay times and light emission. A representative equation, Equation 1, can be generated using least squares fit of the collected data as below.

$$LE_{pre}=m*DT+b, \quad \text{(Equation 1)}$$

where:
$LE_{pre}$ is the predicted light yield,
DT is the measured pulse decay time,
m is the slope of the line, and
b is the y-axis intercept of the line.

Figure 7:
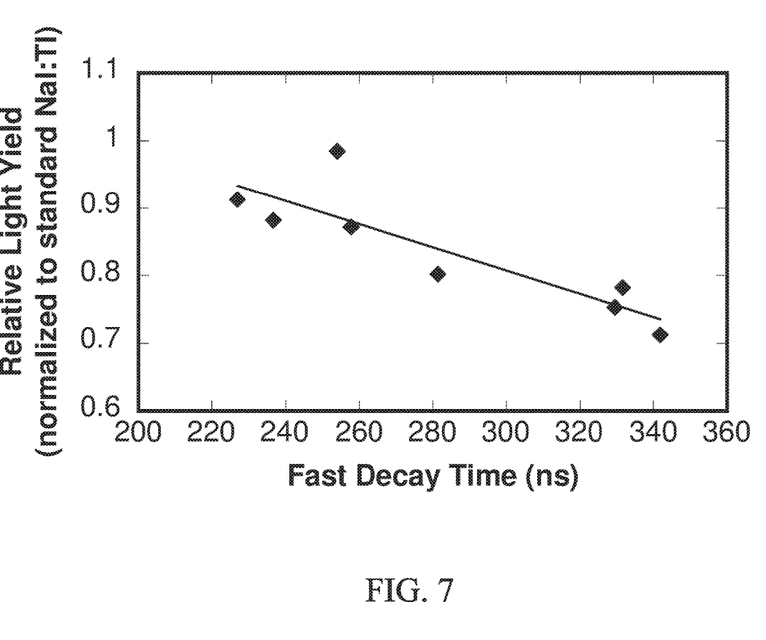
FIG. 7 includes a plot of light emission of a luminescent material over pulse decay time in accordance with an embodiment.

As a non-limiting example, FIG. 7 includes a plot of relative light emission versus pulse decay times of $Li_yNa_{(1-y)}I:Tl$. Relative light emission is actually measured light emission for $Li_yNa_{(1-y)}I:Tl$ normalized to standard light emission of the corresponding NaI:Tl for ease of handling data. The corresponding NAI:Tl does not include Li and has the same concentration of Tl as compared to the $Li_yNa_{(1-y)}I:Tl$. The standard light emission can be previously known or measured light emission of the corresponding NaI:Tl. The ordinate of the plot is relative light emission. The abscissa is the scintillation pulse decay time in units of nanoseconds. The straight line is least squares fit to the data, and the equation for this line is:

$$LE_{rel}=-0.0017*DT+1.323, \quad \text{(Equation 2)}$$

Where:
LE$_{rel}$ is the relative light emission in photons/MeV, and
DT is the measured pulse decay time in nanoseconds.

If needed or desired, different equations may be generated for different co-dopants, different radiation sources, or both. The equations can be of the same format as Equation 1 and may have different values for m and b for the different co-dopants, radiation sources, or both. Equations suitable for different luminescent material compositions may represent a non-linear relationship between pulse decay time and light emission.

After the values for m and b for Equation 1 have been generated, actual measurements of pulse decay time and light emission for a subsequent scintillation event can be determined. For instance, the method can continue to block 632, obtaining a measured decay time and light emission, which can be determined by the logic element, such as the processor 322 or a computer (not illustrated) external to the electronics module 300, based on the received electronic pulse. The method can also include correlating the measured value of the decay time to a predicted value of the light emission based on the equation, at block 634.

The method can continue to block 636, determining an adjustment factor. In an embodiment, the adjustment factor can be:

$$AF=LE_{std}/LE_{pre}, \quad \text{(Equation 3)}$$

Where:
LE$_{std}$ is the standard light emission, and
LE$_{pre}$ is the predicted light emission obtained at block 634.

For example, when the luminescent material 100 is Li$_y$Na$_{(1-y)}$I:Tl, LE$_{std}$ is the standard light emission of the corresponding NaI:Tl. LY$_{std}$ can have a previously known value or may be calculated using the pulse decay time.

The method can continue to block 638, determining an adjusted value of the light emission based on the adjustment factor. In an embodiment, Equation 4 may be used to obtain the adjusted value of the light emission.

$$LY_{adj}=LY_{act}*AF, \quad \text{(Equation 4)}$$

Where:
LY$_{adj}$ is the adjusted light emission, and
AF is the adjustment factor.

In an embodiment, the logic element can be configured to determine the predicted value and the adjusted value of the light emission. The logic element can include Equation 3 and Equation 4. In another embodiment, Equations 1, 3, and 4 can be part of the logic element, such as part of FPGA 324, ASIC, or another suitable device. The FPGA 324 may make the correlation and adjustment faster than another logic element. In a further embodiment, the equations may be stored with the member 326, and the processor 322 can access the equations and make the correlation. In still another embodiment, the equations may be stored in different devices and can be accessed as needed. In another embodiment, the look-up table can be used to determine which entry or entries correlate to the digital signal to determine the adjusted value of the light emission. The table may be stored within the FPGA 324. In a further embodiment, the look-up table may be stored with the member 326, and the processor 322 can access the table and make the correlation. In a further embodiment, one or more of Equations 1, 3 or 4 may be replaced by a look-up table, and a combination of one or more equations and look-up tables can be used to determine the adjusted value of the light emission.

The adjustment allows the light emission of each individual pulse to be scaled by the adjustment factor to reduce the variation in the measured light emission within the same luminescent material or between different luminescent materials having different co-dopant concentrations. This method can improve the energy resolution of the luminescent material. Accordingly, a radiation source may be identified more quickly and accurately, as compared to using the actual measurement without the adjustment.

In an embodiment, the energy resolution of the luminescent material at 662 keV can be based on the adjusted light emission and improved compared to the energy resolution based on the actual measurement of light emission. For instance, the energy resolution can be improved to at most 10%, at most 8%, or at most 7% and in another embodiment, the energy resolution can be improved to at least 3.8%, or at least 4.2%, 4.6%, or at least 5%

Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implement using digital circuits, and vice versa. Embodiments may be in accordance with any one or more of the embodiments as listed below.

EMBODIMENTS

Embodiment 1

A radiation detector comprising:
a logic element configured to:
determine an adjusted value for light emission of a luminescent material based on an inverse correlation between decay times and values of light emissions.

Embodiment 2

The radiation detector of embodiment 1, wherein the logic element is further configured to:
obtain a measured value of a decay time and a measured value for the light emission of the luminescent material,
wherein determining the adjusted value for the light emission of the luminescent material is further based on the measured value of the decay time and the measured value for the light emission of the luminescent material.

Embodiment 3

The radiation detector of embodiment 1 or 2, wherein the adjusted value for the light emission of the luminescent material is the measured value for the light emission of the luminescent material divided by a predicted value for the light emission of the luminescent material.

Embodiment 4

The radiation detector of any one of embodiments 1 to 3, wherein the decay times corresponding to the signal pulses and the values for the light emissions corresponding to the signal pulses have a linear relationship.

Embodiment 5

The radiation detector of any one of embodiments 1 to 3, wherein the decay times and the values for the light emissions have a non-linear relationship.

Embodiment 6

The radiation detector of any one of embodiments 1 to 5, wherein the logic element comprises a processor.

Embodiment 7

The radiation detector of any one of embodiments 1 to 6, wherein the logic element comprises a field programmable gate array or an application-specific integrated circuit.

Embodiment 8

A method of detecting radiation using a radiation detector, the method comprising:
determining an adjusted value for light emission of a luminescent material based on an inverse correlation between decay times and values for light emissions.

Embodiment 9

The method of embodiment 8, further comprising:
obtaining a measured value of a decay time and a measured value for the light emission of the luminescent material,
wherein determining the adjusted value for the light emission of the luminescent material is further based on the measured value of the decay time and the measured value of the light emission of the luminescent material.

Embodiment 10

The method of embodiment 9, wherein adjusting the measured value comprises:
generating an inverse correlation between the decay times and values for light emission;
obtaining an adjustment factor for the light emission of the luminescent material using the inverse correlation and the measured value of the decay time of the luminescent material; and
multiplying the measured value for the light emission of the luminescent material by the adjustment factor for the light emission to obtain the adjusted value for light emission of the luminescent material.

Embodiment 11

The method of any one of embodiments 8 to 10, further comprising:
receiving at a logic element an electronic pulse from a photosensor.

Embodiment 12

The method of embodiment 11, further comprising:
capturing radiation within a luminescent material;
emitting light from the luminescent material; and
receiving at the photosensor the light from the luminescent material.

Embodiment 13

The radiation detector or the method of any one of embodiments 1 to 12, further comprising a photosensor.

Embodiment 14

The radiation detector or the method of embodiment 13, wherein the photosensor is a solid-state photosensor.

Embodiment 15

The radiation detector or the method of any one of embodiments 1 to 14, further comprising an analog-to-digital converter, an amplifier, or a filter.

Embodiment 16

The radiation detector or the method of any one of embodiments 1 to 15, wherein the radiation detector further comprises a luminescent material.

Embodiment 17

The radiation detector or the method of embodiment 16, wherein the luminescent material comprises a halide, a perovskite, a silicate, or a garnet.

Embodiment 18

The radiation detector or the method of embodiment 16, wherein the luminescent material comprises an alkali metal halide.

Embodiment 19

The radiation detector or the method of embodiment 16, wherein the luminescent material comprises a material having a general formula of:

$A_y B_{(1-y)} X:Ac$, wherein:

A represents an alkali metal;
B represents an alkali metal different from A or a combination of alkali metals that are different from A;
Ac is an activator;
X includes a halogen; and
$0 < y < 1$, wherein the material optionally comprises an element Me, wherein Me represents Sc, Bi, Y, La, Lu, Mg, Ca, Sr, Ba, or any combination thereof.

Embodiment 20

The radiation detector or the method of embodiment 19, wherein B is Li, A is Na, Ac is Tl, and X is I.

Embodiment 21

The radiation detector or the method of embodiment 19 or 20, wherein $0 < y \leq 0.25$, or $0 < y \leq 0.02$, or $0.005 \leq y \leq 0.02$.

Embodiment 22

The radiation detector or the method of any one of embodiments 3 to 7, and 10 to 21, wherein the luminescent material has a dimension of at least 25 mm.

Embodiment 23

The radiation detector or the method of any one of embodiments 3 to 7, 10 to 22, wherein the luminescent material includes a dopant having non-zero concentration gradient.

Embodiment 24

The radiation detector or the method of any one of the preceding embodiments, wherein the light emission is light yield.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Certain features, that are for clarity, described herein in the context of separate embodiments, may also be provided in combination in a single embodiment. Conversely, various features that are, for brevity, described in the context of a single embodiment, may also be provided separately or in a subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A radiation detector comprising:
   a logic element configured to:
   determine an adjusted value for light emission of a luminescent material based on an inverse correlation between decay times and values of light emissions.

2. The radiation detector of claim 1, wherein the logic element is further configured to:
   obtain a measured value of a decay time and a measured value for the light emission of the luminescent material,
   wherein determining the adjusted value for the light emission of the luminescent material is further based on the measured value of the decay time and the measured value for the light emission of the luminescent material.

3. The radiation detector of claim 1, wherein the adjusted value for the light emission of the luminescent material is the measured value for the light emission of the luminescent material divided by a predicted value for the light emission of the luminescent material.

4. The radiation detector of claim 1, wherein the decay times corresponding to signal pulses and the values for the light emissions corresponding to the signal pulses have a linear relationship.

5. The radiation detector of claim 1, wherein the decay times and the values for the light emissions have a non-linear relationship.

6. The radiation detector of claim 1, wherein the logic element comprises a processor.

7. The radiation detector of claim 1, wherein the logic element comprises a field programmable gate array or an application-specific integrated circuit.

8. The radiation detector of claim 1, wherein the luminescent material has a dimension of at least 25 mm.

9. The radiation detector claim 1, wherein the radiation detector comprises the luminescent material, wherein the luminescent material includes a dopant having non-zero concentration gradient.

10. The radiation detector of claim 1, wherein the radiation detector comprises the luminescent material, wherein the luminescent material comprises a material having a general formula of:

$$A_y B_{(1-y)} X{:}Ac,$$

wherein:
   A represents an alkali metal;
   B represents an alkali metal different from A or a combination of alkali metals that are different from A;
   Ac is an activator;
   X includes a halogen; and
   $0<y<1$, wherein the material optionally comprises an element Me, wherein Me represents Sc, Bi, Y, La, Lu, Mg, Ca, Sr, Ba, or any combination thereof.

11. The radiation detector of claim 10, wherein $0<y\leq0.25$, or $0<y\leq0.02$, or $0.005\leq y\leq0.02$.

12. The radiation detector of claim 10, wherein B is Li, A is Na, Ac is Tl, and X is I.

13. The radiation detector of claim 1, further comprising a photosensor coupled to the logic element.

14. The radiation detector of claim 13, wherein the photosensor is a solid-state photosensor.

15. A method of detecting radiation using a radiation detector, the method comprising:
   determining an adjusted value for light emission of a luminescent material based on an inverse correlation between decay times and values for light emissions.

16. The method of claim 15, further comprising:
   obtaining a measured value of a decay time and a measured value for the light emission of the luminescent material,
   wherein determining the adjusted value for the light emission of the luminescent material is further based on the measured value of the decay time and the measured value of the light emission of the luminescent material.

17. The method of claim 16, wherein determining the adjusted value for the light emission comprises:
   generating an inverse correlation between the decay times and values for light emission;
   obtaining an adjustment factor for the light emission of the luminescent material using the inverse correlation and the measured value of the decay time of the luminescent material; and
   multiplying the measured value for the light emission of the luminescent material by the adjustment factor for the light emission to obtain the adjusted value for light emission of the luminescent material.

18. The method of claim 15, further comprising:
receiving at a logic element an electronic pulse from a photosensor.

19. The method of claim 15, further comprising:
capturing radiation within a luminescent material;
emitting light from the luminescent material; and
receiving at the photosensor the light from the luminescent material.

20. The method of claim 15, wherein the luminescent material comprises a material having a general formula of:

$$A_y B_{(1-y)} X:Ac,$$

wherein:
A represents an alkali metal;
B represents an alkali metal different from A or a combination of alkali metals that are different from A;
Ac is an activator;
X includes a halogen; and
0<y<1, wherein the material optionally comprises an element Me, wherein Me represents Sc, Bi, Y, La, Lu, Mg, Ca, Sr, Ba, or any combination thereof.

* * * * *

UNITED STATES PATENT AND TRADEMARK OFFICE
CERTIFICATE OF CORRECTION

PATENT NO. : 10,401,509 B2  
APPLICATION NO. : 15/956411  
DATED : September 3, 2019  
INVENTOR(S) : Kan Yang It is certified that error appears in the above-identified patent and that said Letters Patent is hereby corrected as shown below:

In the Specification

Column 8, Line 60, please delete "$Li_yNa_{(i-y)}I:Tl$", and insert --$Li_yNa_{(1-y)}I:Tl$--

Column 9, Line 40, please delete "$Li_yNa_{(i-y)}I:Tl$,", and insert --$Li_yNa_{(1-y)}I:Tl$,--

Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*